United States Patent
Some et al.

(10) Patent No.: US 6,256,405 B1
(45) Date of Patent: Jul. 3, 2001

(54) IMAGE FORMING APPARATUS

(75) Inventors: Masato Some; Takashi Kaneko, both of Kanagawa-Ken (JP)

(73) Assignee: Fuji Photo Film Co., Ltd., Kanagawa-Ken (JP)

( * ) Notice: Subject to any disclaimer, the term of this patent is extended or adjusted under 35 U.S.C. 154(b) by 0 days.

(21) Appl. No.: 09/118,884

(22) Filed: Jul. 20, 1998

Related U.S. Application Data (63) Continuation-in-part of application No. 08/399,465, filed on Mar. 7, 1995.

(30) Foreign Application Priority Data

Apr. 15, 1994 (JP) .................................................. 6-077523

(51) Int. Cl.$^7$ ...................................................... G06K 9/00
(52) U.S. Cl. ............................................... 382/132; 378/42
(58) Field of Search ..................... 382/100, 128, 382/129–133, 181, 305, 312; 345/501, 502, 522, 507; 378/190, 42

(56) References Cited

U.S. PATENT DOCUMENTS

| | | | | |
|---|---|---|---|---|
| 4,202,037 | * | 5/1980 | Glaser et al. | 345/354 |
| 4,592,089 | * | 5/1986 | Hartman | 382/129 |
| 4,865,967 | | 9/1989 | Shiraishi et al. | 435/6 |
| 4,884,200 | * | 11/1989 | Kimura et al. | 382/129 |
| 4,889,990 | | 12/1989 | Hosoi et al. | 250/583 |
| 4,941,164 | * | 7/1990 | Schuller et al. | 378/205 |
| 5,073,963 | * | 12/1991 | Sammons et al. | 382/128 |
| 5,253,169 | * | 10/1993 | Corby, Jr. | 128/654 |
| 5,260,190 | | 11/1993 | Shiraishi et al. | 435/6 |
| 5,270,162 | | 12/1993 | Shiraishi et al. | 435/6 |
| 5,295,488 | | 3/1994 | Lloyd et al. | 600/410 |
| 5,345,543 | | 9/1994 | Capps et al. | 345/437 |
| 5,396,347 | | 3/1995 | Kaneko | 358/448 |
| 5,424,186 | * | 6/1995 | Fodor et al. | 435/6 |
| 5,428,721 | | 6/1995 | Sato et al. | 345/433 |
| 5,432,865 | * | 7/1995 | Kasdan et al. | 382/128 |
| 5,490,246 | | 2/1996 | Brotsky et al. | 345/342 |
| 5,493,622 | * | 2/1996 | Tsuchino et al. | 382/132 |
| 5,539,838 | | 7/1996 | Shimura | 382/128 |
| 5,542,003 | * | 7/1996 | Wofford | 382/132 |

FOREIGN PATENT DOCUMENTS

| | | |
|---|---|---|
| 59-15843 | 1/1984 | (JP) . |
| 61-93538 | 5/1986 | (JP) . |

* cited by examiner

Primary Examiner—Jay Patel
(74) Attorney, Agent, or Firm—Sughrue, Mion, Zinn, Macpeak & Seas, PLLC (57) ABSTRACT

An image forming apparatus includes image data memory for storing image data, an image displaying section for displaying an image on a CRT, a graphic data memory for storing graphic data corresponding to patterns for defining regions of interest in the image on the CRT and a synthesized data producing section for synthesizing the image data and the graphic data to produce synthesized data, the image displaying section being adapted to display the image and pattern on the CRT based on the synthesized data. The apparatus further includes a pattern selecting section for selecting graphic data corresponding to the patterns for defining the regions of interest from among the graphic data stored in the graphic data memory, an editing mode determining section for determining an editing mode for editing the pattern corresponding to the selected graphic data, a graphic data editing section for editing the selected graphic data based on the determined editing mode, and edited graphic data producing section for producing edited graphic data based on the result of the editing of the graphic data editing section, the synthesized data producing section being adapted to produce synthesized data by synthesizing the image data, the graphic data and/or the edited graphic data. According to the thus constituted apparatus, it is possible to surround an area in the image displayed on the CRT by a pattern to specify a region of interest in a desired manner with a memory having a small capacity.

17 Claims, 8 Drawing Sheets

| No. 1 | |
|---|---|
| PATTERN TYPE | CIRCLE |
| x | $x_1$ |
| y | $y_1$ |
| w | $w_1$ |
| h | $h_1$ |
| $\theta_1$ | $\theta_{11}$ |
| $\theta_2$ | $\theta_{21}$ |

| No. 2 | |
|---|---|
| PATTERN TYPE | RECTANGLE |
| x | $x_2$ |
| y | $y_2$ |
| w | $w_2$ |
| h | $h_2$ |
| $\theta_1$ | $\theta_{12}$ |
| $\theta_2$ | $\theta_{22}$ |

| No. n | |
|---|---|
| PATTERN TYPE | BROKEN LINE |
| x | $x_n$ |
| y | $y_n$ |
| w | $w_n$ |
| h | $h_n$ |
| $\theta_1$ | $\theta_{1n}$ |
| $\theta_2$ | $\theta_{2n}$ |

IMAGE FORMING APPARATUS

This is a continuation-in-part of application Ser. No. 08/399,465, filed Mar. 7, 1995.

BACKGROUND OF THE INVENTION

The present invention relates to an image forming apparatus and, particularly, to such an apparatus which can define a region of interest in an image in a desired manner and display the image.

DESCRIPTION OF THE PRIOR ART

Various image analyzing methods are known. These include an autoradiographic process comprising the steps of introducing a radioactively labeled substance into an organism, using the organism or a part of the tissue of the organism as a specimen, placing the specimen and a radiographic film such as a high sensitivity type X-ray film together in layers for a certain period of time to expose the radiographic film thereto and obtaining locational information on the radioactively labeled substance in the specimen from the resolved pattern of the radiographic film, a fluorescent process using a fluorescent substance as a labelling substance rather than the radioactively labeled substance as in the autoradiographic process, a chemiluminescent process comprising the steps of selectively labeling a fixed high molecular substance such as a protein or a nucleic acid sequence with a labeling substance which generates chemiluminescent emission when it contacts a chemiluminescent substance, contacting the high molecular substance selectively labeled with the labeling substance and the chemiluminescent substance, detecting the chemiluminescent emission in the wavelength of visible light generated by the contact of the chemiluminescent substance and the labeling substance and obtaining information relating to the high molecular substance such as genetic information, a detecting method using an electron microscope comprising the steps of irradiating a metal or nonmetal specimen with an electron beam, detecting a diffraction image, transmission image or the like and effecting elemental analysis, composition analysis of the specimen, structural analysis of the specimen or the like, or irradiating the tissue of an organism with an electron beam and detecting an image of the tissue of the organism, and a radiographic diffraction image detecting process comprising the steps of irradiating a specimen with radiation, detecting a radiographic diffraction image and effecting structural analysis of the specimen or the like.

Conventionally, these methods are carried out by employing a photographic film as a detecting material, recording a radiographic image, a fluorescent image, a chemiluminescent image, an electron microscopic image, a radiographic diffraction image or the like on the photographic film and observing a visual image with the eyes. However, in the case where a photographic film is employed as a detecting material, since a radiographic film has low sensitivity, there is a problem that it takes considerable time for recording an image in the autoradiographic process and the radiographic diffraction image detecting process. Further, in the chemiluminescent process, although it is necessary to employ a highly sensitive film having a high gamma value for detecting very weak chemiluminescent emission, when the highly sensitive film having a high gamma value is employed, it is difficult to expose the film reliably using a straight portion of the characteristic curve. Therefore, the film is often exposed improperly and it is necessary to repeatedly expose the films under various exposure conditions. Moreover, in the detecting process using the electron microscope, since the straight portion of the characteristic curve of a photographic film for an electron microscope is short, it is difficult to determine the proper exposure condition and it is necessary to repeatedly expose the films. Furthermore, in any of the above processes, it is indispensable to chemically develop the films and, therefore, the operations are unavoidably complicated.

In view of the above, there have been proposed an autoradiographic process, a chemiluminescent process, a detecting process using an electron microscope and a radiographic diffraction image detecting process comprising the steps of employing, as a detecting material for the radiation, the visible light, the electron beam or the like, not a photographic film, but a stimulable phosphor which can absorb and store the energy of radiation, visible light, an electron beam or the like upon being irradiated therewith and release a stimulated emission whose amount is proportional to that of the received radiation, the visible light, the electron beam or the like upon being stimulated with an electromagnetic wave having a specific wavelength range, photoelectrically detecting the stimulated emission released from the stimulable phosphor, converting the detection signal to a digital signal, effecting a predetermined image processing on the obtained image data and reproducing an image on displaying means such as a CRT or the like or a photographic film (See for example, Japanese Patent Publication No. 1-60784, Japanese Patent Publication No. 1-60782, Japanese Patent Publication No. 4-3952, U.S. Pat. No. 5,028,793, UK Patent Application 2,246,197 A, Japanese Patent Application Laid open No. 61-51738, Japanese Patent Application Laid Open No. 61-93538, Japanese Patent Application Laid Open No. 59-15843 and the like).

According to the detecting processes using the stimulable phosphor, development, which is a chemical processing, becomes unnecessary. In addition, the exposure time can be markedly shortened in the autoradiographic process and the radiographic diffraction image detecting process. Improper exposure becomes rare and the exposing operation becomes easy in the chemiluminescent process and the detecting process using the electron microscope.

Further, since the image is reproduced after the detected signal has been converted to a digital signal, the image can be reproduced in a desired manner by effecting signal processing on image data and it is also possible to effect quantitative analysis using a computer. Use of a stimulable phosphor in these process is therefore advantageous.

Therefore, image forming apparatuses capable of reproducing image data produced by the above described method on a CRT as a visible image have been proposed.

Such image forming apparatuses are generally constituted for comparing properties between desired image areas in an image so as to define a desired image area in an image displayed on displaying means such as a CRT as an area of interest, digitize the amount of light emitted from a stimulable phosphor sheet pixel by pixel in the region of interest and effect quantitative processing by calculating the total value thereof.

For effecting the quantitative processing, the image forming apparatus includes graphic data storing means for storing graphic data consisting of coordinate data of patterns, such as circular pattern, rectangular pattern and the like, used for defining a region of interest in addition to image data storing means for storing image data and is constituted so as to synthesize the image data stored in the image data storing means and the graphic data stored in the graphic data storing means, output the synthesized data to displaying means such as a CRT and reproduce the synthesized data on the CRT or the like as a visible image. In such an image forming apparatus, when an operator uses a mouse to draw a pattern such as a circular pattern, rectangular pattern or the like on an image displayed on the CRT or the like, the image forming apparatus produces graphic data corresponding the drawn pattern such as a circular pattern, rectangular pattern or the like, stores them in the graphic data storing means and quantitatively analyzes the image data within the graphic data using the graphic data and the image data.

However, it is not efficient for the graphic data storing means to store graphic data corresponding to numerous patterns of different shapes and graphic data corresponding to the same patterns of various sizes because this requires use of a memory having an extremely large capacity. Further, even if a memory having an extremely large capacity is used and stores graphic data corresponding to numerous patterns of different shapes and graphic data corresponding to the same patterns of various sizes, since the shape and size of regions of interest defined in an image displayed on displaying means such as a CRT are not regular, it is impossible to surround and specify every type of area of interest using graphic data stored in the graphic data storing means.

The same problems occur in the case where, after an autoradiographic image, a chemiluminescent image, an electron microscopic image, a radiographic diffraction image or the like was recorded on a photographic film, the recorded image is photoelectrically read and converted to a digital signal and the thus obtained image signal is signal processed in a desired manner, thereby reproducing a visible image on displaying means such as a CRT or the like and specifying a region of interest in the image.

SUMMARY OF THE INVENTION

It is therefore an object of the present invention to provide an image forming apparatus for forming an image on display means based on image data which can surround an area in the image displayed on the displaying means by a pattern and specify a region of interest in a desired manner with a memory having a small capacity.

The above and other objects of the present invention can be accomplished by an image forming apparatus comprising image data storing means for storing image data, image displaying means for displaying an image on displaying means based on the image data stored in the image data storing means, graphic data storing means for storing graphic data corresponding to patterns for defining regions of interest in the image displayed on the displaying means and synthesized data producing means for synthesizing the image data and the graphic data to produce synthesized data, the image displaying means being adapted to display the image and pattern on the displaying means based on the synthesized data, the image forming apparatus further comprising pattern selecting means for selecting graphic data corresponding to the patterns for defining the regions of interest from among the graphic data stored in the graphic data storing means, editing mode determining means for determining an editing mode for editing the pattern corresponding to the graphic data selected by the graphic data selecting means, graphic data editing means for editing the graphic data selected by the graphic data selecting means based on the editing mode determined by the editing mode determining means, and edited graphic data producing means for producing edited graphic data based on the result of the editing of the graphic data editing means, the synthesized data producing means being adapted to produce synthesized data by synthesizing the image data, the graphic data and/or the edited graphic data.

In a preferred aspect of the present invention, the pattern selecting means is constituted so as to select predetermined graphic data from among the graphic data stored in the graphic data storing means based on first coordinate data specified by cursor means displayed and movable on the displaying means.

In a further preferred aspect of the present invention, the editing mode determining means is constituted so as to determine the editing mode based on second coordinate data specified by the cursor means.

In a further preferred aspect of the present invention, the graphic data editing means is constituted so as to calculate displacement between the second coordinate data and third coordinate data specified by the cursor means and edit the graphic data by effecting a predetermined calculation based on the thus calculated displacement and the graphic data.

In a further preferred aspect of the present invention, an image forming apparatus further includes coordinate data storing means for sequentially storing the third coordinate data as the cursor means moves and sequentially outputting the third coordinate data to the graphic data editing means.

In a further preferred aspect of the present invention, the image data are produced using a stimulable phosphor sheet.

In a further preferred aspect of the present invention, the image data are constituted by image data selected from a group consisting of autoradiographic image data, radiographic diffraction image data, electron microscopic image data, chemiluminescent image data and fluorescent image data.

In a still further preferred aspect of the present invention, the autoradiographic image data, the radiographic diffraction image data and the electron microscopic image data are produced by absorbing and storing the energy of a radiation or an electron beam emitted from a specimen in a stimulable phosphor, irradiating the stimulable phosphor with an electromagnetic wave and photoelectrically converting light emitted from the stimulable phosphor.

In a further preferred aspect of the present invention, the chemiluminescent image data are produced by absorbing and storing the energy of a visible light emitted from a specimen in a stimulable phosphor, irradiating the stimulable phosphor with an electromagnetic wave and photoelectrically converting light emitted from the stimulable phosphor.

In the present invention, the stimulable phosphor employed for producing an autoradiographic image, a radiographic diffraction image and an electron microscopic image may be of any type insofar as it can store radiation energy or electron beam energy and can be stimulated by an electromagnetic wave to release the radiation energy or electron beam energy stored therein in the form of light.

However, a stimulable phosphor which can be stimulated by light having a visible light wavelength is preferably employed. More specifically, preferably employed stimulable phosphors include alkaline earth metal fluorohalide phosphors $(Ba_{1-x},M^{2+}_x)FX:yA$ (where $M^{2+}$ is at least one alkaline earth metal selected from the group consisting of Mg, Ca, Sr, Zn and Cd; X is at least one halogen selected from the group consisting of Cl, Br and I, A is at least one element selected from the group consisting of Eu, Tb, Ce, Tm, Dy, Pr, He, Nd, Yb and Er; x is equal to or greater than 0 and equal to or less than 0.6 and y is equal to or greater than 0 and equal to or less than 0.2.) disclosed in U.S. Pat. No. 4,239,968, alkaline earth metal fluorohalide phosphors SrFX:Z (where X is at least one halogen selected from the group consisting of Cl, Br and I; and Z is at least one of Eu and Ce.) disclosed in Japanese Patent Application Laid Open No. 2-276997, europium activated complex halide phosphors BaFX.xNaX':aEu$^{2+}$ (where each of X or X' is at least one halogen selected from the group consisting of Cl, Br and I; x is greater than 0 and equal to or less than 2; and y is greater than 0 and equal to or less than 0.2.) disclosed in Japanese Patent Application Laid Open No. 589-56479, cerium activated trivalent metal oxyhalide phosphors MOX:xCe (where M is at least one trivalent metal selected from the group consisting of Pr, Nd, Pm, Sm, Eu, Tb, Dy, Ho, Er, Tm, Yb and Bi; X is at least one halogen selected from the group consisting of Br and I; and x is greater than 0 and less than 0.1.) disclosed in Japanese Patent Application Laid Open No. 58-69281, cerium activated rare earth oxyhalide phosphors LnOX:xCe (where Ln is at least one rare earth element selected from the group consisting of Y, La, Gd and Lu; X is at least one halogen selected from the group consisting of Cl, Br, and I; and x is greater than 0 and equal to or less than 0.1.) disclosed in U.S. Pat. No. 4,539,137 and europium activated complex halide phosphors M$^{II}$FX.aM$^{I}$X'.bM$^{II}$X''$_2$.cM$^{III}$X'''$_3$.xA:yEu$^{2+}$ (where M$_{II}$ is at least one alkaline earth metal selected from the group consisting of Ba, Sr and Ca; M$^{I}$ is at least one alkaline metal selected from the group consisting of Li, Na, K, Rb and Cs; M$^{II}$ is at least one divalent metal selected from the group consisting of Be and Mg; M$^{III}$ is at least one trivalent metal selected from the group consisting of Al, Ga, In and Tl; A is at least one metal oxide; X is at least one halogen selected from the group consisting of Cl, Br and I; each of X', X'' and X''' is at least one halogen selected from the group consisting of F, Cl, Br and I; a is equal to or greater than 0 and equal to or less than 2; b is equal to or greater than 0 and equal to or less than $10^{-2}$; C is equal to or greater than 0 and equal to or less than $10^{-2}$; a+b+c is equal to or greater than $10^{-2}$; X is greater than 0 and equal to or less than 0.5; and y is greater than 0 and equal to or less than 0.2.) disclosed in U.S. Pat. No. 4,962,047.

In the present invention, the stimulable phosphor employed for producing a chemiluminescent image may be of any type insofar as it can store the energy of light having a visible light wavelength and can be stimulated by an electromagnetic wave to release the energy of light having a visible light wavelength stored therein in the form of light. However, a stimulable phosphor which can be stimulated by light having a visible light wavelength is preferably employed. More specifically, preferably employed stimulable phosphors include metal halophosphates, rare-earth-activated phosphors, aluminate-host phosphors, silicate-host phosphors and fluoride-host phosphors disclosed in UK Patent Application 2,246,197 A.

In a further preferred aspect of the present invention, a fluorescent data image is obtained from fluorescence emitted from an image carrier such as a gel support or a transfer support. The image carrier includes the case where the image carrier carries an image of a specimen labelled by a labeling substance and the case where the image carrier carries an image of fluorescent substances obtained by combining an enzyme with a specimen labeled by a labelling substance, causing the enzyme to contact a fluorescent substrate and transforming the fluorescent substrate to a fluorescent substance.

In the present invention, the fluorescent substance employed for labeling a specimen to form an image to be carried into an image carrier and read by stimulating it using a laser beam having a wavelength from 633 nmn or 635 nm may be of any type insofar it can be stimulated by a laser beam of the above wavelengths. Preferable substances are Cy-5 (registered trademark) indicated by the structural formula below:

Cy-5

Another substance includes Allphycocyanin and the like.

The above and other objects and features of the present invention will become apparent from the following description made with reference to the accompanying drawings.

DESCRIPTION OF THE PREFERRED EMBODIMENTS

Figure 1:
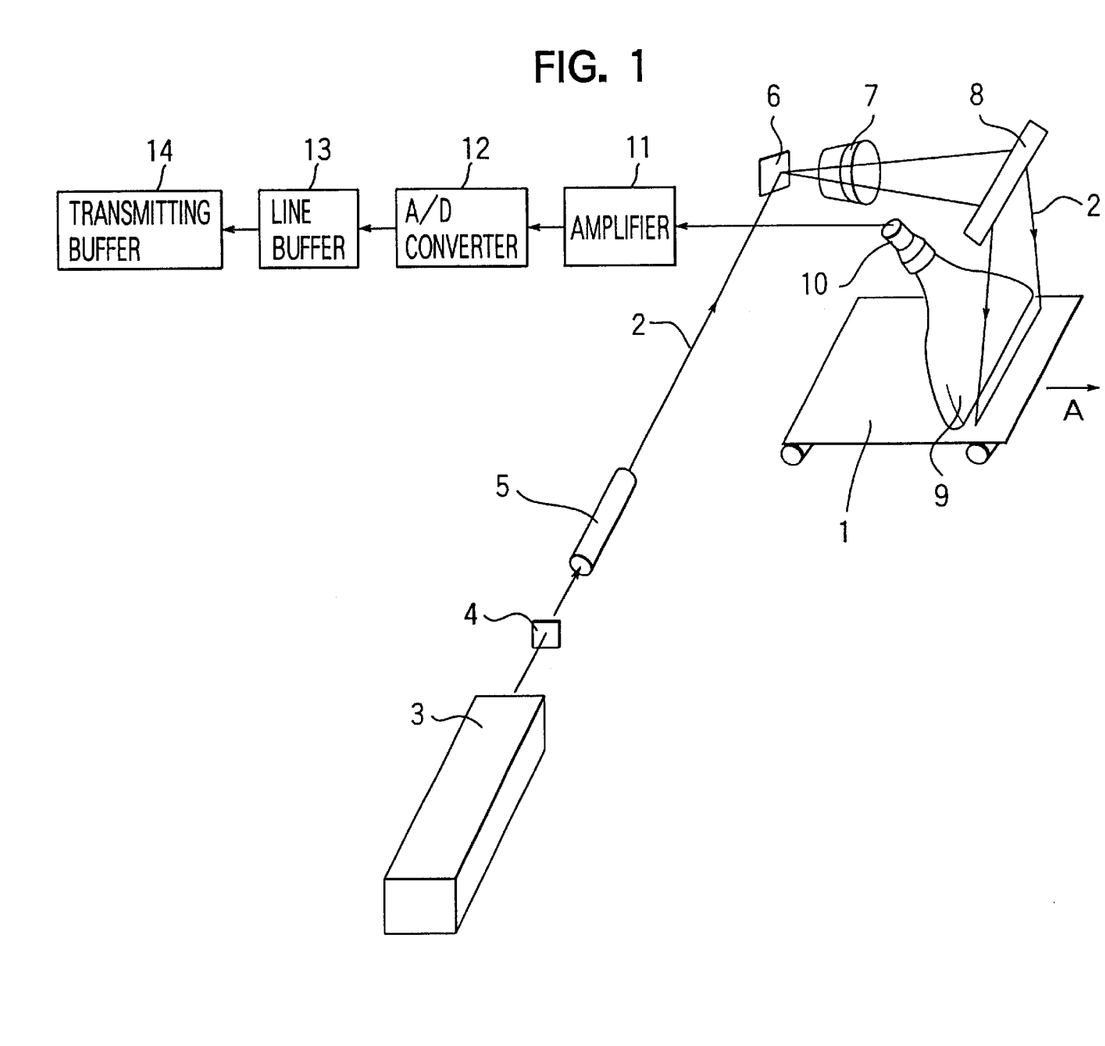
FIG. 1 is a schematic perspective view showing an image reading apparatus for producing image data for an autoradiographic image forming apparatus which is an embodiment of the present invention.

A stimulable phosphor sheet 1 shown in FIG. 1 stores locational information regarding radioactive labeling material contained in a specimen (not shown) in the form of radioactive energy.

In this embodiment, the stimulable phosphor sheet 1 stores locational information regarding a radioactively labeled substance contained in a gene produced by the Southern blotting method and the hybridization method.

Locational information as termed here includes a variety of information relating to the location of radioactive labeled substances, or aggregations thereof, present in a specimen, such as the location, the shape, the concentration, the distribution or combinations thereof.

The locational information regarding a radioactively labeled substance is stored in the stimulable phosphor sheet 1, for example, in the following manner. First, a plurality of DNA fragments containing specific gene information are separated and distributed on a gel support medium by means of electrophoresis and are denatured by alkali processing to form single-stranded DNA. Then, according to the known Southern blotting method, the gel support and a transfer support such as a nitrocellulose filter are placed in layers to transfer at least a part of the denatured DNA fragments onto the transfer support and the transferred DNA fragments are fixed on the transfer support by heating. Further, a probe prepared by radioactively labeling DNA or RNA which is complementary to the DNA containing the specific gene and the denatured DNA fragments are hybridized by heating to form double-stranded DNAs or combined DNA and RNA. Since the denatured DNAs are fixed on the transfer support at this time, only the DNA fragments which are complimentary to the probe DNA or probe RNA are hybridized to acquire the radioactively labeled probe. Then, the probes which have not formed hybrids is cleaned and removed by a proper solution and only the DNA fragments having specific gene form hybrids with the radioactively labeled DNA or RNA on the transfer support to be radioactively labeled. The thus obtained transfer support and the stimulable phosphor sheet 1 are placed in layers for a certain period of time to expose the stimulable phosphor sheet 1 and at least a part of radiation emitted from the radioactively labeled substance on the transfer support is absorbed in the stimulable phosphor sheet 1, whereby the locational information regarding the radioactively labeled substance in the specimen is stored in the stimulable phosphor sheet 1.

The stimulable phosphor sheet which stores the locational information regarding a radioactive material in the specimen in this manner is scanned with a laser beam 2 and stimulated, thereby being caused to emit stimulated emission.

The laser beam 2 is generated by a laser beam source 3 and passes through a filter 4 to cut off light in the wavelength region corresponding to the wavelength region of stimulated emission to be emitted from the stimulable phosphor sheet 1 in response to stimulation by the laser beam 2. The beam diameter of the laser beam 2 is accurately adjusted by a beam expander 5 and the laser beam 2 enters a beam deflector 6 such as a galvanometer. The laser beam 2 deflected by the beam deflector 6 passes through an fθ lens 7 and is reflected by a plane reflecting mirror 8, thereby impinging upon the stimulable phosphor sheet 1. The fθ lens 7 ensures that the stimulable phosphor sheet 1 is always scanned with the laser beam 2 at a uniform beam speed.

The stimulable phosphor sheet 1 is conveyed in the direction along the arrow in FIG. 1 in synchronism with the above mentioned scanning with the laser beam 2 so that the whole surface of the stimulable phosphor sheet 1 is scanned by the laser beam 2.

When irradiated with the laser beam 2, the stimulable phosphor sheet 1 releases stimulated emission in an amount proportional to the radiation energy stored therein and the stimulated emission enters a light guiding sheet 9.

The light receiving end of the light guiding sheet 9 has a linear shape and is positioned in the vicinity of the stimulable phosphor sheet 1 so as to face the scanning line on the stimulable phosphor sheet 1. The exit end of the light guiding sheet 9 is in the form of a ring and is connected to the light receiving surface of a light detector 10 such as a photomultiplier for photoelectrically detecting light. This light guiding sheet 9 is made by processing a transparent thermoplastic resin sheet such as an acrylic synthetic resin and so constituted that the emission introduced from the light receiving end is transmitted to the exit end under repeated total reflection within the light guiding sheet 9 and received by the light receiving surface of the light detector 10 via the exit end.

Therefore, the stimulated emission produced by the stimulable phosphor sheet 1 upon being irradiated with the laser beam 2 enters into the light guiding sheet 9 and is received by the light detector 10 via the exit end under repeated total reflection within the sheet 9.

On the light receiving surface of the light detector 10 is provided a filter which allows only light of the wavelength region of the stimulated emission released from the stimulable phosphor sheet 1 to pass through and cuts of f light of the wavelength region of the laser beam so that the light detector 10 can photoelectrically detect only the stimulated emission released from the stimulable phosphor sheet 1.

The stimulated emission photoelectrically detected by the light detector 10 is converted to an electrical signal, amplified by an amplifier 11 having a predetermined amplifying factor so as to produce an electrical signal of a predetermined level and then input to an AD converter 12. The electrical signal is converted to a digital signal with a scale factor suitable for the signal fluctuation width and input to a line buffer 13. The line buffer 13 temporarily stores image data corresponding to one scanning line. When the image data corresponding to one scanning line have been stored in the line buffer 13 in the above described manner, the line buffer 13 outputs the data to a transmitting buffer 14 whose capacity is greater than that of the line buffer 13 and when the transmitting buffer 14 has stored a predetermined amount of the image data, it outputs the image data to an autoradiographic image forming apparatus.

Figure 8:
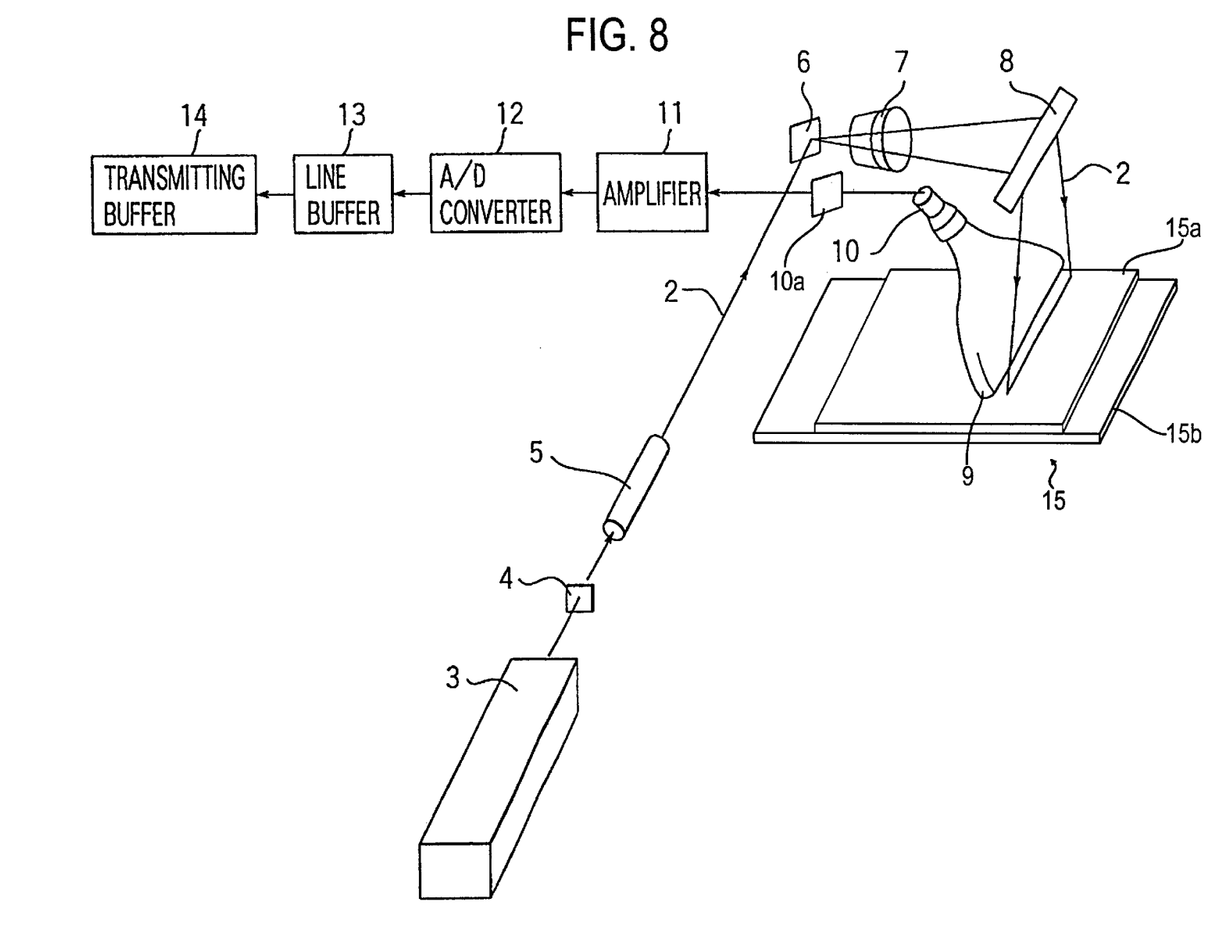
FIG. 8 is a schematic perspective view showing an image reading apparatus for producing image data for a fluorescent image forming apparatus according to another embodiment of the invention.

FIG. 8 illustrates a set up for an image reading apparatus when the stimulable phosphor sheet 1 is replaced by an image carrier 15 for fluorescent data. An image reading apparatus includes a laser stimulating ray source 3 for emitting a laser beam having a wavelength of 633 nm. The first laser may comprise a He—Ne laser beam source.

A laser beam 2 emitted from the source 3 passes through a filter 4 and a beam expander 5. The light reflects from a mirror 6 and passes through a fθ lens 7 and is reflected by a mirror 8, thereby impinging on a sheet like fluorescent carrier 15 set on a glass plate 15a. The fθ lens ensures that the fluorescent image carrier unit 15 is always scanned with the laser beam at a uniform speed.

The apparatus according to this embodiment is able to read out an image of fluorescent dye recorded in a transfer support, a gel support or the like. In FIG. 8, the fluorescent image carrier unit 15 includes the plate 15a and a transfer support 15b placed on the glass plate and in which an electrophoresis image of denatured DNA labeled with fluorescent dye is recorded. The preparation of the electrophoresis image is described below.

First, a plurality of DNA fragments containing a specific gene are separated and distributed on a gel support medium by means of electrophoresis and are denatured by alkali processing to form single-stranded DNA. Then, according to the known Southern blotting method, the gel support and a transfer support 12 are stacked to transfer at least a part of the denatured DNA fragments onto the transfer support 12 and the transferred DNA fragments are fixed on the transfer support by heating and irradiating with an ultraviolet ray. Further, probes prepared by labeling DNA or RNA with fluorescent dye, which is complementary to the DNA containing the specific gene and the denatured DNA fragments on the transfer support 12 are hybridized by heating to form double-stranded DNA fragments or combined DNA and RNA. In this embodiment, Fluorescein is used as fluorescent dye and DNA or RNA which is complementary to the DNA containing the specific gene is labeled therewith to prepare the probes. Since the denatured DNA fragments are fixed on the transfer support 12 at this time, only the DNA fragments which are complimentary to the probe DNA or probe RNA are hybridized to acquire the fluorescently labeled probe. Then, the probes which have not formed hybrids are removed by washing with a proper solution and only the DNA fragments having a specific gene form hybrids with the fluorescently labeled DNA or RNA on the transfer support 12 to be fluorescently labeled. The thus obtained transfer support records an electrophoresis image of the denatured DNA labeled with the fluorescent dye.

The image reading apparatus described above can be used to read a fluorescent image carried in the stimulable phosphor if a filter 10a is disposed at the light receiving surface of the light detector 10. The filter 10a preferably cuts off light having a wavelength of 633 nm or less and transmits light having a wavelength longer than 633 nm. Specifically, light emitted from a fluorescent substance in response to excitation using a stimulating ray has a wavelength longer than that of the stimulating ray and, therefore, the filter attached to the light receiving surface of the detector 10 must cut off the wavelength of the stimulating ray and transmit light having a wavelength longer than the stimulating ray.

Other features similar to those of FIG. 1 are represented by the same reference numerals, and no detailed description is provided here.

Figure 2:
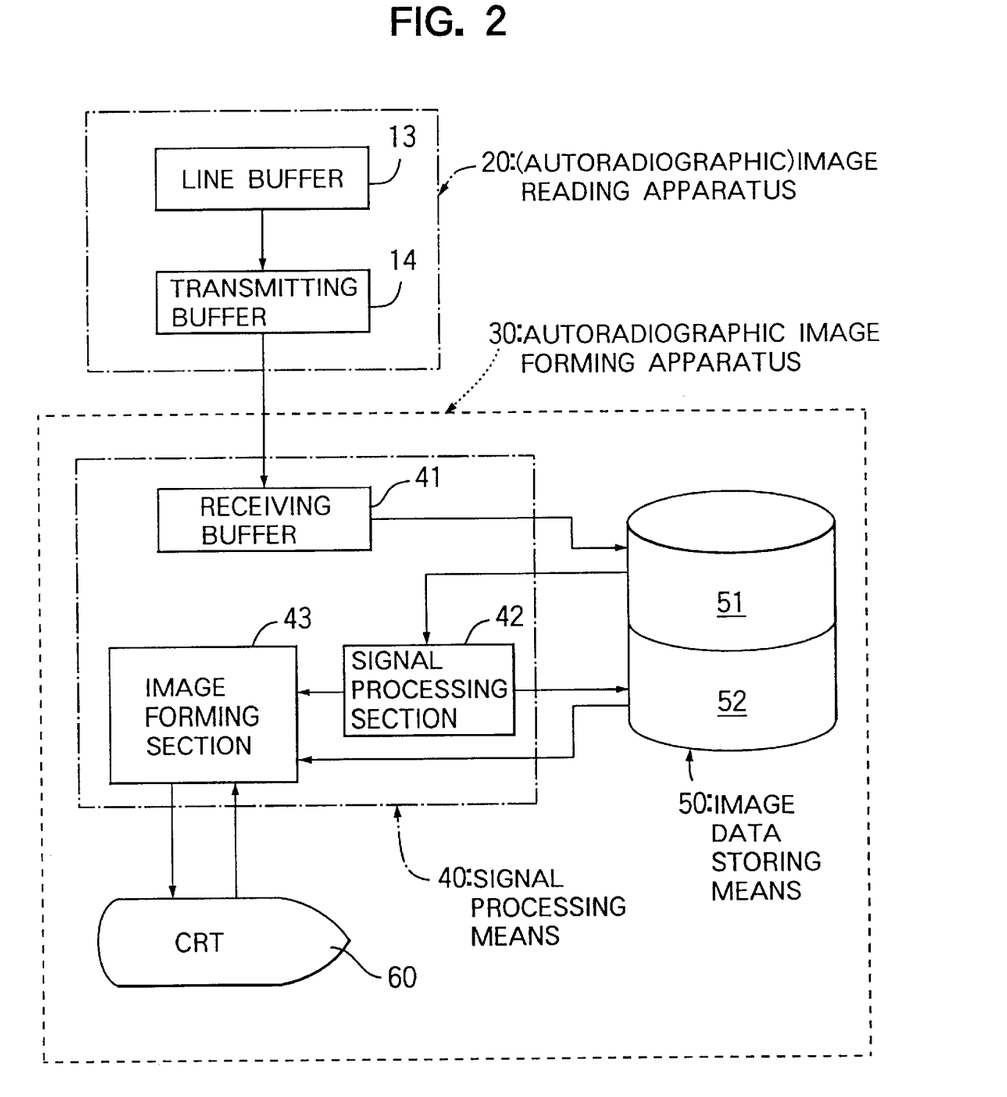
FIG. 2 is a block diagram of an autoradiographic image forming apparatus and an image reading apparatus.

FIG. 2 is a block diagram of the autoradiographic image forming apparatus and the image reading apparatus. The arrangement for the embodiment for a fluorescent image forming apparatus and fluorescent image reading apparatus is similar.

As shown in FIG. 2, the autoradiographic image forming apparatus 30 includes signal processing means 40 for receiving image data containing locational information regarding radioactive labeling material contained in a specimen, which were stored and recorded in the stimulable phosphor sheet 1, read out by the image reading apparatus 20 and converted to a digital signal, processing them so as to reproduce a visible image which has desirable density, tone, contrast and the like and has excellent observation and analysis property, and defining a desired area in the image data to calculate the gray levels of the image data in the area, image data storing means 50 for temporarily storing image data which were input to the signal processing means 40 from the image reading apparatus 20 and storing signal-processed image data, and a CRT 60 for reproducing an image based on the image data containing locational information regarding radioactive labeling material contained in a specimen.

The image data temporarily stored in the transmitting buffer 14 of the image reading apparatus 20 are input to a receiving buffer 41 in the signal processing means 40 of the autoradiographic image forming apparatus 30 and temporarily stored therein. When a predetermined amount of the image data have been stored, the stored image data are output to an image data temporary storing section 51 in the image data storing means 50 and stored therein. In this manner, the image data fed from the transmitting buffer 14 of the image reading apparatus 20 to the receiving buffer 41 of the signal processing means 60 and temporarily stored therein are fed from the transmitting buffer 14 to the image data temporary storing section 51 in the image data storing means 50. When the image data obtained by scanning the whole surface of the stimulable phosphor sheet 1 with the laser beam 2 have been stored in the image data temporary storing section 51 in the image data storing means 50, the signal processing section 42 in the signal processing means 40 reads the image data from the image data temporary storing section 51 and stores them in an image data storing section 52.

Figure 3:
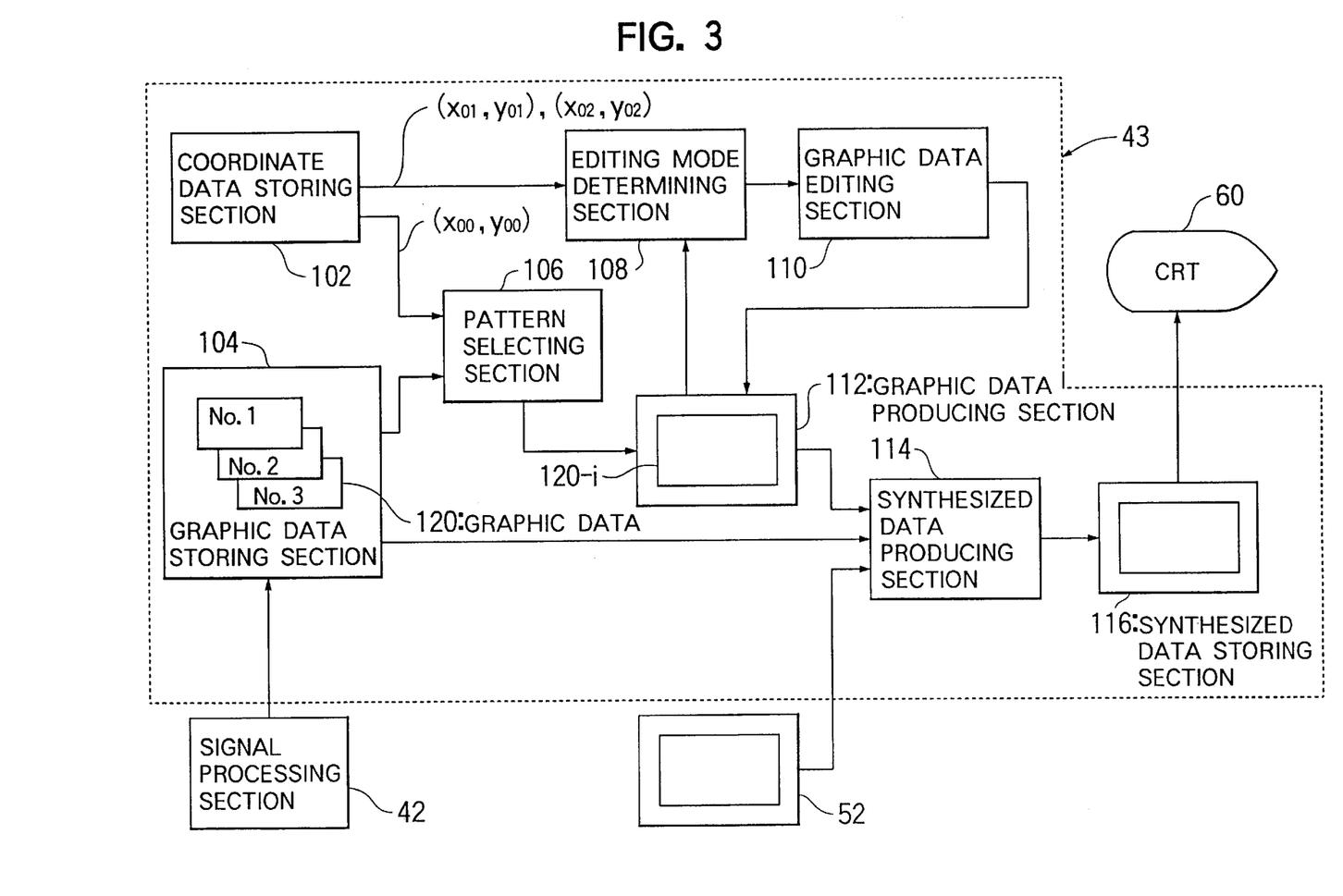
FIG. 3 is a block diagram of an image forming section and peripheral circuits of an autoradiographic image forming apparatus.

FIG. 3 is a block diagram of an image forming section 43 of the signal processing means 40 and peripheral circuits of the autoradiographic image forming apparatus which is an embodiment of the present invention. As shown in FIG. 3, the image forming section 43 includes a coordinate data storing section 102 for storing coordinate data corresponding to the position in the image data of a mouse pointer moved on the screen of the CRT 60 by the operation of a mouse (not shown) by an operator, a graphic data storing section 104 for storing graphic data corresponding to patterns such as a circular pattern, rectangular pattern and the like for surrounding a region of interest in an image displayed on the screen of the CRT 60, a pattern selecting section 106 for selecting graphic data to be edited from the graphic data storing section 104 based on the mouse pointer coordinate data stored in the coordinate data storing section 102, a editing mode determining section 108 for selecting a predetermined editing mode from among various editing modes described later and determining an editing mode, a graphic data editing section 110 for editing the graphic data selected by the pattern selecting section 106 in accordance with the editing mode determined by the editing mode determining section 108, a graphic data producing section 112 for temporarily storing the graphic data selected by the pattern selecting section 106 and producing edited graphic data based on a signal input from the graphic data editing section 110, a synthesized data producing section 114 for synthesizing the image data stored in the image data storing section 52 and the graphic data produced by the graphic data storing section 112 and producing synthesized data, and a synthesized data storing section 116 for temporarily storing the synthesized data produced by the synthesized data storing section 114.

In this embodiment, an operator selects the shape of graphic data stored in a memory (not shown) by operating a mouse for surrounding a region of interest in an image displayed on the screen of the CRT 60 and draws the pattern of the selected shape on the screen of the CRT 60, whereby graphic data 120 are produced and stored in the graphic data storing section 104. As described above, when the shape of graphic data are selected and the pattern of the selected shape is drawn on the screen of the CRT 60, the image data stored in the image data storing section 52 and the graphic data stored in the graphic data storing section 104 are synthesized in the synthesized data producing section 114 and a synthesized image corresponding to the synthesized data are displayed on the screen of the CRT 60 via the synthesized data storing section 114.

Figure 4:
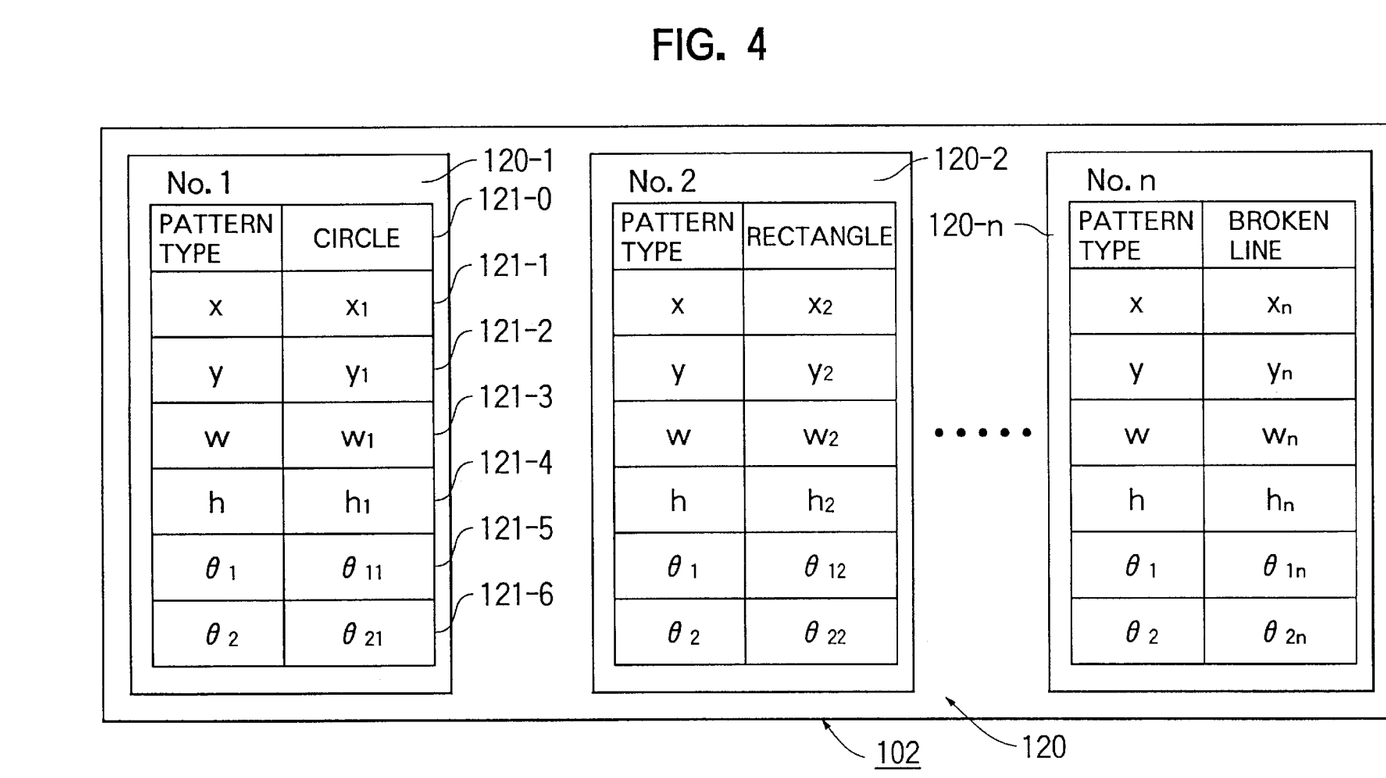
FIG. 4 is a view showing an example of the content of graphic data stored in a graphic data storing section.

The graphic data storing section 104 stores graphic data corresponding to various patterns having the shapes thus selected by the operator and predetermined coordinates in accordance with the shapes thereof. FIG. 4 shows an example of the content of graphic data stored in the graphic data storing section 104. As shown in FIG. 4, the graphic data 120 include pattern type data showing kinds of patterns, x-coordinates of the reference points of patterns, y-coordinates of the reference points of patterns, width data w of patterns, height data h of patterns, rotation angle data $\theta_1$ and angle data $\theta_2$ indicating the extent of deformation in an oblique direction, namely, skewing.

Figure 5:
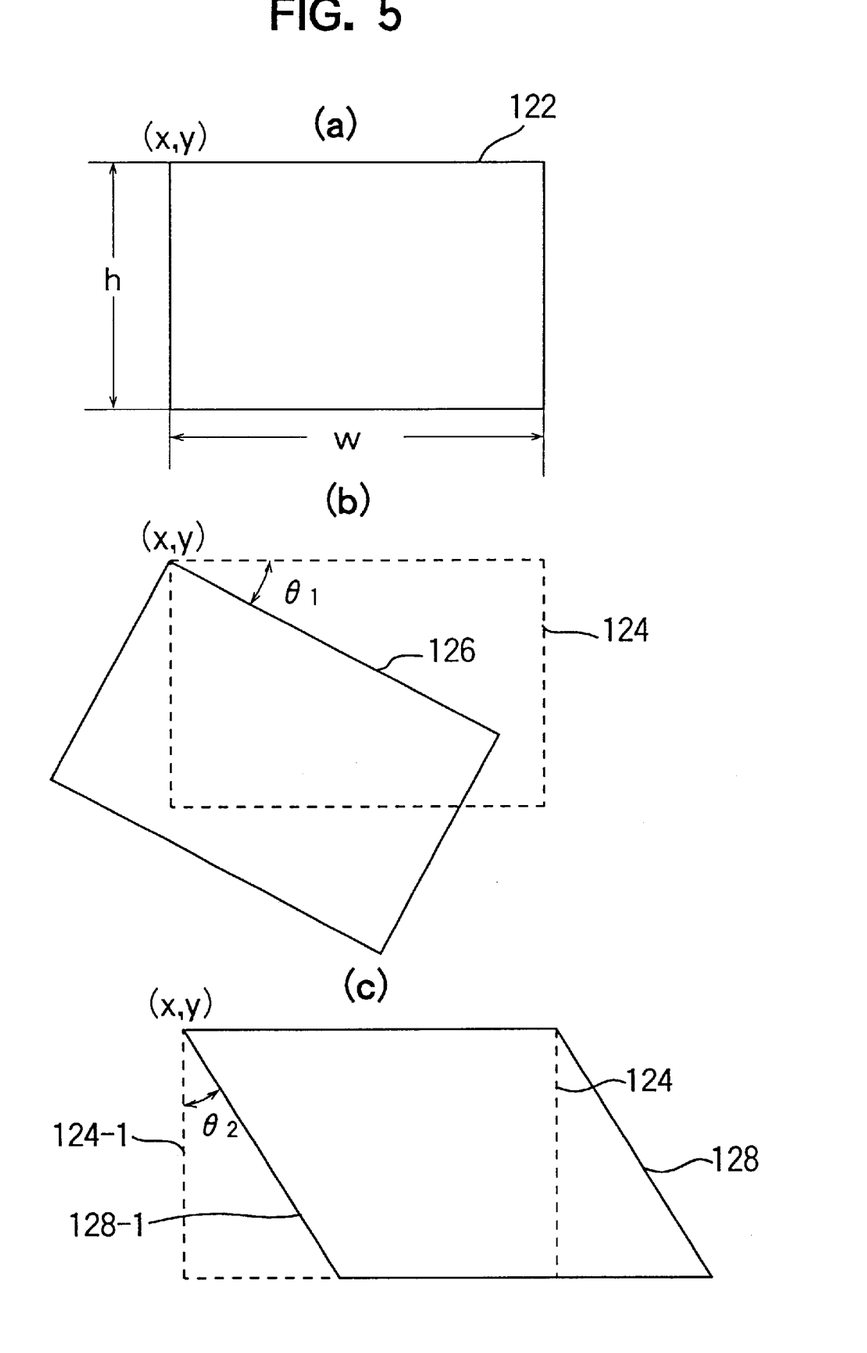
FIGS. 5(a)–(c) is a view for explaining graphic data.

In this embodiment, the pattern type data include a circular pattern, rectangular pattern, a pattern surrounded by a broken line pattern and the like. Further, the x-coordinate and y-coordinate show the coordinates (x, y) of the upper left corner of the rectangular pattern circumscribing the pattern. Therefore, in the case where, as shown in FIG. 5(a), the pattern 122 is rectangular, the pattern 122 coincides with circumscribing rectangular pattern.

Explanation will now be made regarding the case where the pattern type is rectangular. The width data w indicate the length of the pattern 122 along the x-coordinate axis and the height data h indicate the length of the pattern 122 along the y-coordinate axis. As shown in FIG. 5(b), the rotation angle data $\theta_1$ indicate the angle between a pattern 126 rotated about the coordinates (x, y) of the reference point and a reference pattern 124 located at the reference position. Further, as shown in FIG. 5(c), the angle data $\theta_2$ indicate an extent of skewing, namely, the angle between the side 128-1 of a pattern 128 which is formed by deforming the reference pattern 124 while the area thereof is maintained constant and the side 124-1 of the reference pattern 124.

As shown in FIG. 4, first graphic data 120-1 include, for example, pattern type data "circular pattern", x-coordinate data $x_1$, y-coordinate data $y_1$, width data $w_1$, height data $h_1$, rotation angle data $\theta_{11}$ and angle data $\theta_{21}$ indicating extent of skewing. Similarly, second graphic data 120-2 include seven kinds of data, namely, pattern type data "rectangular pattern", x-coordinate data $x_2$, y-coordinate data $y_2$, width data $w_2$, height data $h_2$, rotation angle data $\theta_{12}$ and angle data $\theta_{22}$ indicating extent of skewing. In this manner, the graphic data storing section 104 stores graphic data in a number equal to that of patterns drawn on the screen of the CRT 60 by the operator. For instance, if n kinds of patterns have been drawn on the screen of the CRT 60, as shown in FIG. 4, n kinds of graphic data 120-1 to 120-n are stored in the coordinate data storing section 102.

The thus constituted image forming section 43 and the peripheral circuits define a region of interest as follows.

An operator uses a mouse (not shown) to move a mouse pointer displayed on the screen of the CRT 60 to a portion where a pattern to be edited is displayed and clicks the mouse to select the pattern to be edited, whereby the pattern type data of graphic data stored in the graphic data storing section 104 are selected.

Then, the operator uses the mouse to move the mouse pointer displayed on the screen of the CRT 60 to the portion where the pattern is to be displayed and clicks the mouse.

The coordinates of the mouse pointer obtained by clicking the mouse are stored as first coordinate data $(x_{00}, y_{00})$ in the coordinate data storing section 102. The first coordinate data $(x_{00}, y_{00})$ stored in the coordinate data storing section 102 is output to the pattern selecting section 106 and the pattern selecting section 106 selects graphic data 120-i corresponding to the pattern selected by the operator as the pattern to be edited based on the first coordinate data $(x_{00}, y_{00})$ and outputs the graphic data 120-i to the graphic data producing section 112. The graphic data producing section 112 temporarily stores the input graphic data 120-i therein and outputs the graphic data 120-i to the synthesized data producing section 114. The graphic data 120-i input to the synthesized data producing section 114 and image data stored in the image data storing section 52 are synthesized and after the synthesized data have been temporarily stored in the synthesized data storing section 116, the data are displayed as an image together with a predetermined image on the screen of the CRT 60 at a position of the mouse pointer determined by clicking the mouse.

Figure 6:
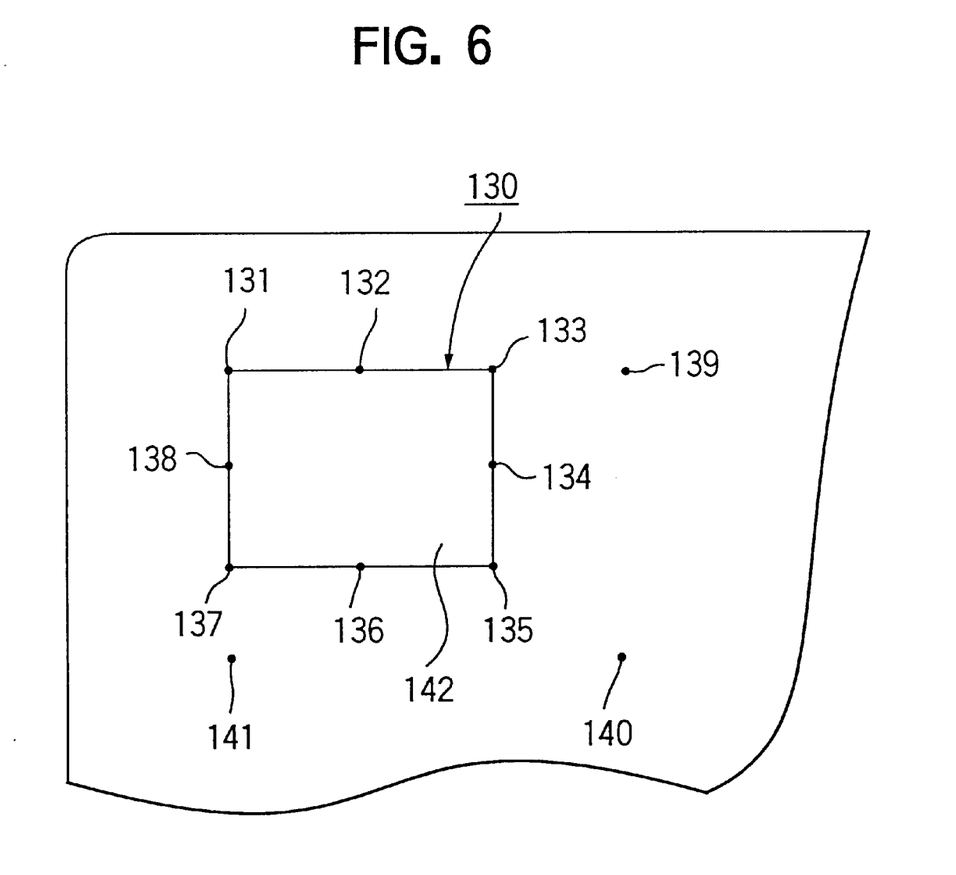
FIG. 6 is a view showing selected pattern displayed on the screen of a CRT when predetermined graphic data are selected based on first coordinate data.

FIG. 6 shows the selected pattern displayed on the screen of the CRT 60 when predetermined graphic data 120-i are selected based on the first coordinate data $(x_{00}, y_{00})$. As shown in FIG. 6, the pattern 130 corresponding to the selected graphic data 120-i is formed with eleven dots 131 to 141 produced by a predetermined processing effected by the signal processing section 41. These dots will be described later.

When the operator wishes to modify the shape or the size of the pattern 130, he or she pushes the button of the mouse at the time the mouse pointer is moved to the desired position. The coordinate data storing section 102 stores the coordinates of the mouse pointer when the button of the mouse is pushed by the operator as second coordinate data $(x_{01}, y_{01})$ and outputs the second coordinate data $(x_{01}, y_{01})$ to the editing mode determining section 108.

When second coordinate data $(x_{01}, y_{01})$ are input, the editing mode determining section 108 selects the editing mode based on the second coordinate data $(x_{01}, y_{01})$. The editing mode is adapted to modify the shape or the size of the pattern displayed on the screen of the CRT 60 and includes a moving mode for moving the pattern, an enlarging/reducing mode for enlarging or reducing the pattern, a one-direction enlarging mode for enlarging the pattern only in one direction, a rotation mode for rotating the pattern and a deformation mode for deforming the pattern in an oblique direction. As shown in FIG. 6, the pattern 130 displayed on the screen of the CRT 60 is formed with the eleven dots 131 to 141. The editing mode determining section 108 judges whether the second coordinate data $(x_{01}, y_{01})$ are included in any of the dots 131 to 141 or the inside 142 of the pattern 130 and selects an editing mode depending on the judgment as to which among the dots 131 to 141 and the inside 142 of the pattern 130 the operator selects. In this embodiment, if the inside 142 of the pattern 130 is selected, the moving mode is selected and if one of the dots 131, 133, 135 and 137 is selected, the enlarging/reducing mode is selected. If one of the dots 132, 134, 136 and 138 is selected, the one-direction enlarging mode is selected and if the dot 140 is selected, the rotation mode is selected. Further, if the dot 141 is selected, the deformation mode is selected and if the dot 139 is selected, the rotation mode and the deformation mode are selected. The editing mode determining section 108 outputs editing mode data corresponding to the selected editing mode and the second coordinate data $(x_{01}, y_{01})$ input from the coordinate data storing section 102 to the graphic data editing section 110.

After the operator has moved the mouse pointer to the desired position and pushed the button of the mouse to select the editing mode, he or she instructs the autoradiographic image forming apparatus 30 how the shape or the size of the pattern 130 should be modified by moving the mouse pointer on the screen of the CRT 60, while keeping the button of the mouse depressed. As a result, the coordinate data storing section 102 stores the coordinates of the mouse pointer being moved while the button of the mouse is held down as third coordinate data $(x_{02}, y_{02})$ and sequentially outputs the third coordinate data $(x_{02}, y_{02})$ to the graphic data editing section 110 via the editing mode determining section 108.

The graphic data editing section 110 modifies various data such as the x-coordinate data and the y-coordinate data included in the graphic data 120-i temporarily stored in the graphic data producing section 112 for modifying the shape or the size of the pattern 130 based on the second coordinate data $(x_{01}, y_{01})$ and the third coordinate data $(x_{02}, y_{02})$ input from the coordinate data storing section 102 and the editing mode data input from the editing mode determining section 108.

Figure 7:
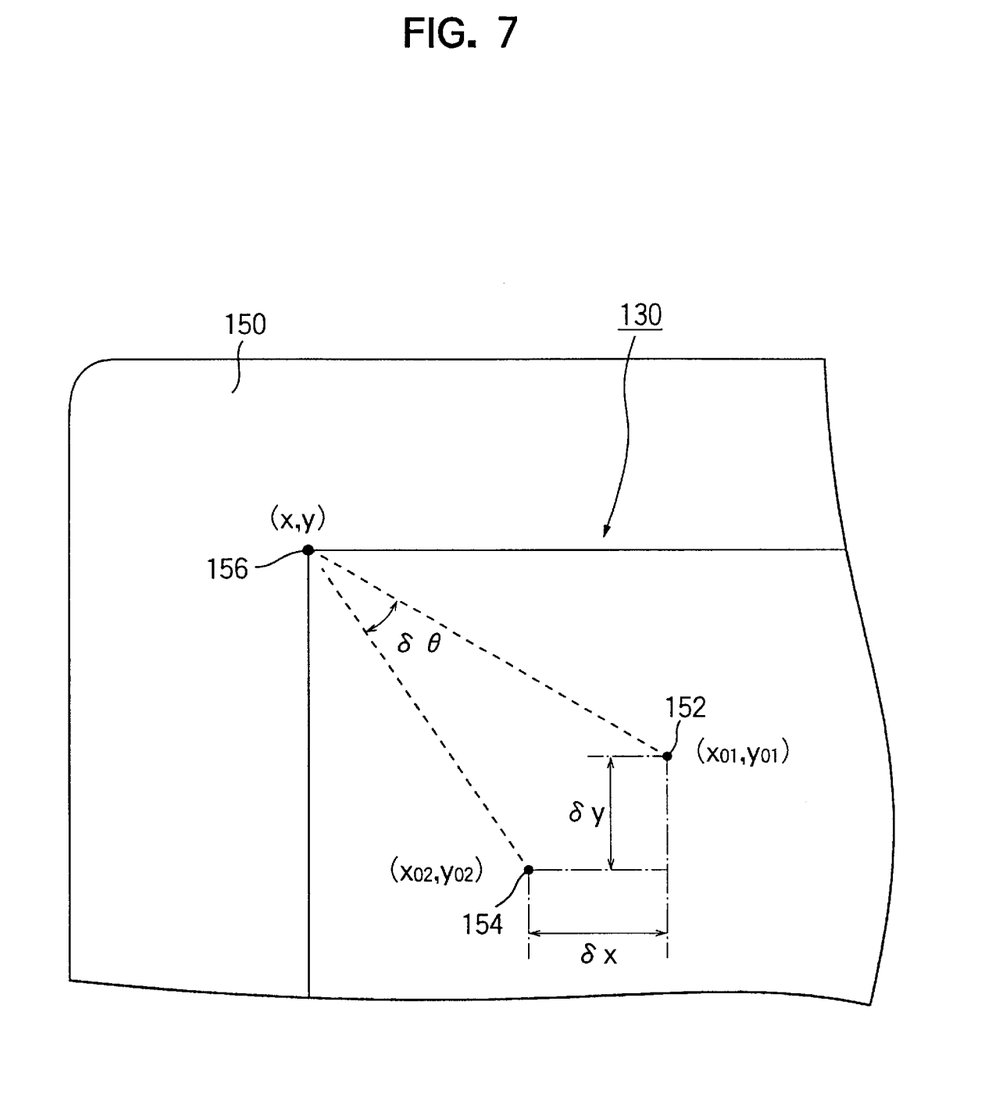
FIG. 7 is a view for explaining a calculating method of displacement.

The modification of the various data included in the graphic data 120-i effected by the graphic data editing section 110 will now be explained. First, the graphic data editing section 110 calculates the displacement between the second coordinate data $(x_{01}, y_{01})$ indicating the coordinates of the mouse pointer when the operator pushed the button of the mouse and the third coordinate data $(x_{02}, y_{02})$ indicating the coordinates of the mouse pointer being moved, while the button of the mouse is held down. FIG. 7 is a view for explaining the calculating method of the displacement. As shown in FIG. 7, the point on the screen 150 of the CRT 50 corresponding to the second coordinate data $(x_{01}, y_{01})$ are the dot 152 and the point on the screen of the CRT 50 corresponding to the third coordinate data $(x_{02}, y_{02})$ is the dot 154. Further, the dot 156 corresponds to a position having the x-coordinate and the y-coordinate of the graphic data 120 corresponding to the pattern 130 and its coordinate is shown by $(x, y)$. The graphic data editing section 110 effects the following calculation.

(1) The displacement in the coordinate (x-axis direction)

$$\delta x = x_{02} - x_{01}$$

(2) The displacement in the ordinate (y-axis direction)

$$\delta y = y_{02} - y_{01}$$

(3) The displacement of rotation $$\delta\theta = \tan^{-1}\{(y_{02}-y)/(x_{02}-x)\} - \tan^{-1}\{(y_{01}-y)/(x_{01}-x)\}$$

Then, the graphic data editing section 110 modifies at least one of six kinds of data constituting the graphic data 120 stored in the graphic data storing section 112, namely, x-coordinate data, y-coordinate data, width data, height data, rotation angle data and deformation data showing deformation in an oblique direction, based on the editing mode data and the thus calculated displacements $\delta x$, $\delta y$ and $\delta\theta$. For example, in the case where the editing mode data input from the editing data determining section 108 correspond to the moving mode, namely, where the inside 142 of the pattern 130 is selected, the graphic data editing section 110 modifies the x-coordinate to be $x=x+\delta x$ and the y-coordinate to be $y=y+\delta y$ and writes the modified data in predetermined portions of the graphic data 120-i temporarily stored in the graphic data producing section 112. If, instead, the editing mode data input from the editing mode determining section 108 correspond to the enlarging/reducing mode, as shown in FIG. 6, the data are modified as follows in accordance with the dot selected by the operator from among the dots 131, 133, 135 and 137.

(1) When the dot 131 is selected, the x-coordinate is modified to be $x=x-\delta x$, the y-coordinate is modified to be $y=y-\delta y$, the width data are modified to be $w=w-\delta w$ and the height data are modified to be $h=h-\delta h$, thereby writing the modified data in predetermined portions of the graphic data 120-i temporarily stored in the graphic data producing section 112.

(2) When the dot 133 is selected, the y-coordinate is modified to be $y=y-\delta y$, the width data are modified to be $w=w+\delta w$ and the height data are modified to be $h=h+\delta h$, thereby writing the modified data in predetermined portions of the graphic data 120-i temporarily stored in the graphic data producing section 112.

(3) When the dot 13 is selected, the width data are modified to be $w=w+\delta w$ and the height data are modified to be $h=h+\delta h$, thereby writing the modified data in predetermined portions of the graphic data 120-i temporarily stored in the graphic data producing section 112.

(4) When the dot 137 is selected, the x-coordinate is modified to be $x=x-\delta x$, the width data are modified to be $w=w+\delta w$ and the height data are modified to be $h=h+\delta h$, thereby writing the modified data in predetermined portions of the graphic data 120-i temporarily stored in the graphic data producing section 112.

In the case where the editing mode data input from the editing mode determining section 108 correspond to the one-direction enlarging mode, as shown in FIG. 6, the data are modified as follows in accordance with the dot selected by the operator from among the dots 132, 134, 136 and 138.

(1) When the dot 132 is selected, the y-coordinate is modified to be $y=y-\delta y$ and the height data are modified to be $h=h+\delta h$, thereby writing the modified data in predetermined portions of the graphic data 120-i temporarily stored in the graphic data producing section 112.

(2) When the dot 134 is selected, the width data are modified to be $w=w+\delta w$ and the modified data are written in predetermined portions of the graphic data 120-i temporarily stored in the graphic data producing section 112.

(3) When the dot 136 is selected, the height data are modified to be $h=h+\delta h$ and the modified data are written in predetermined portions of the graphic data 120-i temporarily stored in the graphic data producing section 112.

(4) When the dot 138 is selected, the x-coordinate is modified to be $x=x-\delta x$, the width data are modified to be $w=w+\delta w$, thereby writing the modified data in predetermined portions of the graphic data 120-i temporarily stored in the graphic data producing section 112.

In the case where the editing mode data input from the editing mode determining section 108 correspond to the rotation mode, the rotation angle data are modified to be $\theta_1 = \theta_1 + \delta\theta$ and the thus modified rotation angle data are written in predetermined portions of the graphic data 120-i temporarily stored in the graphic data producing section 112.

In the case where the editing mode data input from the editing mode determining section 108 correspond to the deformation mode, the angle data showing the extent of deformation in an oblique direction are modified to be $\theta_2 = \theta_2 + \delta\theta$ and the thus modified data are written in predetermined portions of the graphic data 120-i temporarily stored in the graphic data producing section 112.

In the case where the editing mode data input from the editing mode determining section 108 correspond to the rotation mode and the deformation mode, the rotation angle data are modified to be $\theta_1=\theta_1+\delta\theta$ and the angle data showing the extent of deformation in an oblique direction are modified to be $\theta_2=\theta_2-\delta\theta$, thereby writing the modified data in predetermined portions of the graphic data 120-i temporarily stored in the graphic data producing section 112.

As described above, the graphic data editing section 110 modifies the graphic data temporarily stored in the graphic data producing section 112 based on the editing mode data input from the editing mode determining section 108 and the second coordinate data ($x_{01}$, $y_{01}$) and the third coordinate data ($x_{02}$, $y_{02}$) input from the coordinate data storing section 102. Therefore, graphic data whose shape, size or the like has been modified are produced in the graphic data producing section 112. The modified graphic data are output to the synthesized data producing section 114 and the synthesized data producing section 114 synthesizes the modified graphic data and the image data output from the image data storing section 52 to produce the synthesized data.

The synthesized data synthesized in the synthesized data producing section 114 are temporarily stored in the synthesized data storing section 116 and output to the CRT 60, which displays them as a visible image.

As the operator moves the mouse while holding the button down, the third coordinate data ($x_{02}$, $y_{02}$) are stored in the coordinate data storing section 102 sequentially. As a consequence, every time the third coordinate data ($x_{02}$, $y_{02}$) are changed, the above described operation is repeated in the image forming section 43 and patterns whose shape, size or the like has been modified are displayed on the screen of the CRT 60 one after another.

In this manner, the operator can produce a pattern having a desired shape and size. After, the shape and the size of the pattern has been determined, in accordance with a predetermined operation instructed by the operator, the signal processing section 42 of the signal processing means 40 compares the graphic data 120-i stored in the graphic data producing section 112 and the image data stored in the image data storing section 52 and quantitatively analyzes the image data within the graphic data.

According to the above described embodiment, the graphic data 120-i to be edited are selected by the pattern selecting section 106 based on the first coordinate data ($x_{00}$, $y_{00}$) stored in the coordinate data storing section 102 and temporarily stored in the graphic data producing section 112. The editing mode is determined by the editing mode determining section 108 based on the second coordinate data ($x_{01}$, $y_{01}$) stored in the coordinate data storing section 102. Further, various data constituting the graphic data are modified based on the second coordinate data ($x_{01}$, $y_{01}$) and the third coordinate data ($x_{02}$, $y_{02}$) stored in the coordinate data storing section 102 and the editing mode determined by the editing mode determining section 108, the modified data are written in predetermined portions in the graphic data 120-i temporarily stored in the graphic data producing section 112 and the thus modified graphic data and the image data are synthesized in the synthesized data producing section 114 to produce the synthesized data. Therefore, the operator can form a pattern having desired shape and size on the screen of the CRT 60 and define a region of interest in an image in the desired manner.

The present invention has thus been shown and described with reference to specific embodiments. However, it should be noted that the present invention is in no way limited to the details of the described arrangements but changes and modifications may be made without departing from the scope of the appended claims.

For example, in the above described embodiment, the locational information regarding a gene obtained by the Southern blotting method and the hybridization method is stored in the stimulable phosphor sheet 1, photoelectrically read out, signal-processed in a predetermined manner and displayed on the CRT 50 and graphic data corresponding to a pattern having desired shape and size are produced so that a region of interest in the image is defined by the pattern having desired shape and size. However, the present invention is not limited to such autoradiography and can also be applied to autoradiographic images such as an autoradiographic image of a protein produced by thin layer chromatography (TLC), an autoradiographic image produced by polyacrylamide gel electrophoresis for the separation or identification of protein or the estimation of molecular weight or properties of protein or the like, or an autoradiographic image for studying the metabolism, absorption, excretion path and state of a substance introduced into a test animal such as a mouse. Further, the present invention is applicable for producing density profiles of chemiluminescent images produced by a chemiluminescent process such as a chemiluminescent image of a gene produced by the Southern blot hybridization method, a chemiluminescent image of a protein produced by thin layer chromatography, a chemiluminescent image produced by polyacrylamide gel electrophoresis for the separation or identification of a protein or the estimation of molecular weight or properties of a protein or the like. Moreover, the present invention can be widely applied to produce density profiles of an electron beam transmission image or an electron beam diffraction image of a metal or nonmetal produced by an electron microscope, an electron beam image of tissue of an organism and a radiographic diffraction image of a metal or nonmetal.

Further, in the above described embodiment, although a circular pattern, rectangular pattern and a pattern surrounded by broken lines are used for defining a region of interest and graphic data corresponding thereto are stored in the graphic data storing section 102, the is patterns used for defining the region of interest are not limited to these patterns and it is possible to use, for example, a polygon pattern or the like as the pattern.

Furthermore, in the above described embodiment, although graphic data include pattern type data, x-coordinate data, y-coordinate data, width data, height data, rotation angle data and angle data indicating extent of deformation in an oblique direction, the graphic data are not limited to these. The graphic data may include only some of these data or include other data in addition thereto.

Moreover, in the above described embodiment, although the image data are produced by using the stimulable phosphor sheet 1 and converting locational information regarding radioactive labeling substance to an electrical signal and are displayed on the CRT 50 as a visible image, it is possible to once form a visible image on a photographic film instead of the stimulable phosphor sheet 1, photoelectrically read the visible image, convert it to an electrical signal and process the thus obtained image data in a similar manner to the above.

Further, in the present invention, the respective means need not necessarily be physical means and arrangements whereby the functions of the respective means are accomplished by software fall within the scope of the present invention. In addition, the function of a single means may be accomplished by two or more physical means and the functions of two or more means may be accomplished by a single physical means.

According to the present invention, it is possible to provide an image forming apparatus for forming an image on display means based on image data which can surround an area in the image displayed on the displaying means by a pattern and specify a region of interest in a desired manner with a memory having a small capacity.

What is claimed is:

1. An image forming apparatus, comprising:
   image data storing means for storing image data, said image data being produced from an image of fluorescent substances;
   image displaying means for displaying an image on displaying means based on the image data stored in the image data storing means;
   graphic data storing means for storing graphic data corresponding to patterns for defining regions of interest in the image displayed on the displaying means;
   synthesized data producing means for synthesizing the image data and the graphic data to produce synthesized data, the image displaying means being adapted to display the image and pattern on the displaying means based on the synthesized data;
   pattern selecting means for selecting graphic data corresponding to the patterns for defining the regions of interest from among the graphic data stored in the graphic data storing means;
   editing mode determining means for determining an editing mode for editing the pattern corresponding to the graphic data selected by the pattern selecting means;
   graphic data editing means for editing the graphic data selected by the pattern selecting means based on the editing mode determined by the editing mode determining means; and
   edited graphic data producing means for producing edited graphic data based on the result of the editing of the graphic data editing means, the synthesized data producing means being adapted to produce synthesized data by synthesizing the image data, the graphic data and/or the edited graphic data.

2. An image forming apparatus in accordance with claim 1 wherein the pattern selecting means is constituted so as to select predetermined graphic data from among the graphic data stored in the graphic data storing means based on first coordinate data specified by cursor means displayed and movable on the displaying means.

3. An image forming apparatus in accordance with claim 2 wherein the editing mode determining means is constituted so as to determine the editing mode based on second coordinate data specified by the cursor means.

4. An image forming apparatus in accordance with claim 3 wherein the graphic data editing means is constituted so as to calculate displacement between the second coordinate data and third coordinate data specified by the cursor means and edit the graphic data by effecting a predetermined calculation based on the thus calculated displacement and the graphic data.

5. An image forming apparatus in accordance with claim 4 which further comprises coordinate data storing means for sequentially storing the third coordinate data as the cursor means moves and sequentially outputting the third coordinate data to the graphic data editing means.

6. An image forming apparatus in accordance with claim 1 wherein the editing mode determining means is constituted so as to determine the editing mode based on second coordinate data specified by cursor means.

7. An image forming apparatus in accordance with claim 6 wherein the graphic data editing means is constituted so as to calculate displacement between the second coordinate data and third coordinate data specified by the cursor means and edit the graphic data by effecting a predetermined calculation based on the thus calculated displacement and the graphic data.

8. An image forming apparatus in accordance with claim 7 which further comprises coordinate data storing means for sequentially storing the third coordinate data as the cursor means moves and sequentially outputting the third coordinate data to the graphic data editing means.

9. The image forming apparatus in accordance with claim 1, wherein said editing mode determining means determines the editing mode based on a specified position coordinate of said image, the position coordinate being specified by a cursor positioned thereon.

10. The image forming apparatus in accordance with claim 9, wherein said position coordinate is one of a plurality of position coordinates which are provided on said image for selecting the following editing modes: a moving mode; an enlarging/reducing mode; a one direction enlarging/reducing mode; a rotation mode; a deformation mode; and a rotation and deformation mode.

11. The image forming apparatus in accordance with claim 1, wherein, in accordance with the editing mode selected, said graphic data editing means edits at least one of: an x-coordinate data; a y-coordinate data; height data; width data; rotation angle data; and deformation data.

12. The image forming apparatus in accordance with claim 1, wherein said editing mode determining means determines the editing mode based on a specified position coordinate of a cursor relative to the outline of the graphic data.

13. The image forming apparatus in accordance with claim 12, wherein said position coordinate is one of a plurality of position coordinates which are provided about said outline for selecting the following editing modes: a moving mode when the cursor is inside the outline; an enlarging/reducing mode when the cursor is on the outline at a first predetermined region; a one direction enlarging/reducing mode when the cursor is on the outline at a second predetermined region; a rotation mode when the cursor is outside the outline at a third predetermined region; a deformation mode when the cursor is outside the outline at a fourth predetermined region; and a rotation and deformation mode when the cursor is outside the outline at a fifth predetermined region.

14. An image forming apparatus, comprising:
   an image data memory in which image data is stored, said image data being produced from an image of fluorescent substances;
   a display on which an image is displayed, the image being based on the image data stored in the image data memory;
   a graphic data memory in which is stored graphic data corresponding to patterns for defining regions of interest in the image displayed on the display;
   a data synthesizer which synthesizes the image data and the graphic data to produce synthesized data, the display being adapted to display the image and pattern based on the synthesized data;
   a pattern selector which selects graphic data corresponding to the patterns for defining the regions of interest from among the graphic data stored in the graphic data memory;
   an editing mode selector which selects an editing mode for editing the pattern corresponding to the graphic data selected by the pattern selector;

a graphic data editor which edits the graphic data selected by the pattern selector based on the editing mode selected by the editing mode selector; and a graphic data generator which produces edited graphic data based on the result of the editing of the graphic data editor, the data synthesizer being adapted to produce synthesized data by synthesizing the image data, the graphic data and/or the edited graphic data.

15. The image forming apparatus in accordance with claim 14, wherein said editing mode selector selects the editing mode based on a specified position coordinate of said image, the position coordinate being specified by a cursor positioned thereon.

16. The image forming apparatus in accordance with claim 15, wherein said position coordinate is one of a plurality of position coordinates which are provided on said image for selecting each of the following editing modes: a moving mode; an enlarging/reducing mode; a one direction enlarging/reducing mode; a rotation mode; a deformation mode; and a rotation and deformation mode.

17. The image forming apparatus in accordance with claim 14, wherein, in accordance with the editing mode selected, said graphic data editor edits at least one of: an x-coordinate data; a y-coordinate data; height data; width data; rotation angle data; and deformation data.

* * * * *